United States Patent [19]
Zafred

[11] Patent Number: 4,502,511
[45] Date of Patent: Mar. 5, 1985

[54] TUBE PLUG

[75] Inventor: Paolo R. Zafred, Pittsburgh, Pa.

[73] Assignee: Westinghouse Electric Corp., Pittsburgh, Pa.

[21] Appl. No.: 455,434

[22] Filed: Jan. 3, 1983

[51] Int. Cl.³ ............................................. F16L 55/10
[52] U.S. Cl. ...................................... 138/89; 29/523
[58] Field of Search ............... 138/89; 29/421 R, 523; 220/228, 308

[56] References Cited

U.S. PATENT DOCUMENTS

| | | | |
|---|---|---|---|
| 791,351 | 5/1905 | Malloy | 138/89 |
| 1,837,345 | 12/1931 | Thomas | 138/89 X |
| 4,178,966 | 12/1979 | Savor et al. | 138/89 |
| 4,237,937 | 12/1980 | Healy | 138/89 X |
| 4,303,103 | 12/1981 | Marks et al. | 29/523 |
| 4,390,042 | 6/1983 | Kucherer et al. | 138/89 |

FOREIGN PATENT DOCUMENTS

| | | | |
|---|---|---|---|
| 2127830 | 6/1970 | Fed. Rep. of Germany | 138/89 |
| 707570 | 4/1954 | United Kingdom | 138/89 |
| 1241802 | 8/1971 | United Kingdom | 138/89 |

*Primary Examiner*—James E. Bryant, III
*Attorney, Agent, or Firm*—L. A. DePaul

[57] ABSTRACT

The tube plug comprises a one piece mechanical plug having one open end and one closed end which is capable of being inserted in a heat exchange tube and internally expanded into contact with the inside surface of the heat exchange tube for preventing flow of a coolant through the heat exchange tube. The tube plug also comprises a groove extending around the outside circumference thereof which has an elastomeric material disposed in the groove for enhancing the seal between the tube plug and the tube.

1 Claim, 2 Drawing Figures

TUBE PLUG

BACKGROUND OF THE INVENTION

This invention relates to tube plugs and more particularly to tube plugs having an elastomeric material on the outer surface thereof.

In tube-type heat exchangers, a first fluid flows through the tubes of the heat exchanger while a second fluid surrounds the outside of the tubes such that heat exchange occurs between the two fluids. Occasionally, one of the tubes can become defective such that a leak occurs therein which allows the fluids to mingle. When this occurs, it is sometimes necessary to plug the tube so that the fluid does not flow through the tube, thereby preventing leakage from the tube.

In nuclear reactor power plants, the tube-type heat exchangers are commonly referred to as steam generators. When a defect occurs in the tubes of a nuclear steam generator that allows the coolant in the tubes to mingle with the coolant outside of the tubes, a more significant problem arises. Not only does this situation create an ineffective heat exchanger, but it also creates a radioactive contamination problem. Since the fluid flowing in the tubes of a nuclear steam generator is generally radioactive, it is important that it not be allowed to leak from the tubes and contaminate the fluid surrounding the tubes. Therefore, when a leak occurs in a nuclear steam generator heat exchange tube, the heat exchange tube must either be plugged or repaired so that the coolant does not leak from the tube. This prevents contamination of the fluid surrounding the tubes.

There are several method known in the art for repairing heat exchange tubes, however, many of these methods are not applicable to repair of heat exchange tubes wherein the tube is not readily accessible. For example, in a nuclear steam generator the physical inaccessibility of defective heat exchange tubes and the radioactive nature of the environment surrounding the heat exchange tubes presents unique problems to repairing heat exchange tubes that do not normally exist in other heat exchangers. For these reasons, special methods have been developed for repairing heat exchange tubes in nuclear steam generators. Typically, the method used to repair a heat exchange tube in a nuclear steam generator is one in which a metal sleeve having an outside diameter slightly smaller than the outside diameter of the defective tube is inserted into the defective tube and attached to the defective tube to bridge the defective area of the tube. This type of repair method is generally referred to as "sleeving". Previous sleeving development work has been concerned with obtaining a relatively leakproof joint between the sleeve and the tube by brazing, arc welding, explosive welding, or other joining means. Due to the need for cleanliness, close fittings, heat application, and atmospheric control, these metallurgical bonding techniques have problems which are not easily solvable in areas such as nuclear steam generators where human access is limited.

There are also several kinds of plugs that may be used to plug the heat exchange tubes. One such device used to plug heat exchange tubes in nuclear steam generators is an explosive plugging device. With the explosive plugging devices, a metal plug is inserted in the heat exchange tube with an explosive contained within the plug. When the explosive is detonated, the plug is forced into close contact with the inside of the tube, thus blocking flow through the tube. One problem associated with explosive plugging is that should it become necessary to replace the defective tube or defective plug, the explosive plug must be removed by machining methods which is a time consuming procedure.

Another type of plug that can be used to plug heat exchange tubes which do not use explosives is known as a mechanical plug. However, many of these mechanical plugs suffer from defects such as not being as leak tight as necessary, difficult to remove from a tube, difficult to install in a tube, or require assembly in the field.

Since tube plugs to be used in a nuclear reactor environment must be easily installable, leak tight, and easily removable, many of the plugs known in the prior art are generally not acceptable for use in nuclear steam generators. Therefore, what is needed is a mechanical plug that is capable of being quickly and easily installed in a heat exchange tube of a nuclear steam generator for preventing the flow of reactor coolant therethrough.

SUMMARY OF THE INVENTION

The tube plug comprises a one piece mechanical plug having one open end and one closed end which is capable of being inserted in a heat exchange tube and internally expanded into contact with the inside surface of the heat exchange tube for preventing flow of a coolant through the heat exchange tube. The tube plug also comprises a groove extending around the outside circumference thereof which has an elastomeric material disposed in the groove for enhancing the seal between the tube plug and the tube.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

When a heat exchange tube in a nuclear steam generator becomes defective, it becomes necessary to either plug the heat exchange tube or to repair the defective area. The invention described herein provides a tube plug for effectively plugging a tube in a heat exchanger and thus preventing circulation of a fluid through the heat exchange tube.

Figure 1:
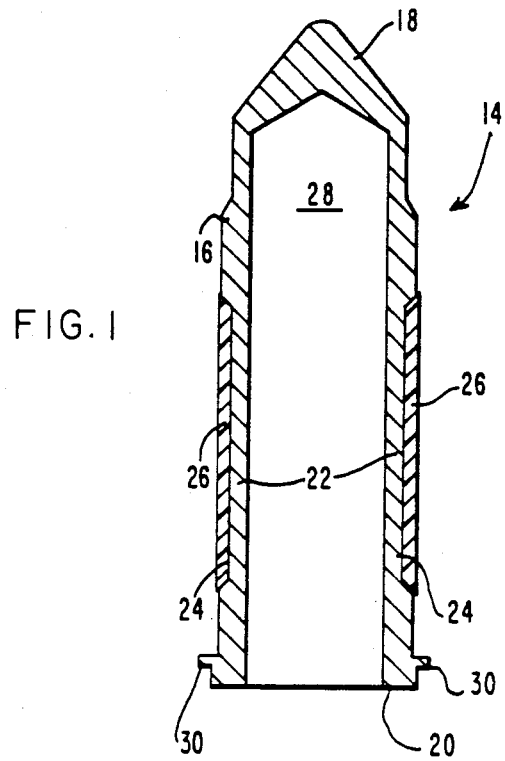
FIG. 1 is a cross-sectional view of the tube plug.
Figure 2:
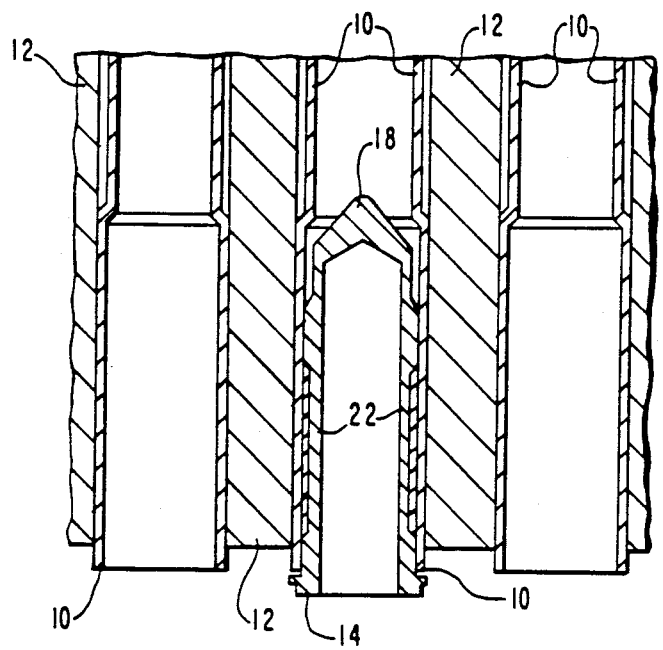
FIG. 2 is a cross-sectional view of the tube plug disposed in a heat exchange tube.

Referring to FIGS. 1 and 2, the nuclear steam generator (not shown) comprises a plurality of heat exchange tubes 10 which may be U-shaped tubes and are attached at each end to a tube sheet 12. During operation of the nuclear steam generator, reactor coolant flows through the heat exchange tubes 10 in a manner so as to heat fluid surrounding tubes 10. The fluid around tubes 10 is converted to steam to produce electricity in a conventional manner. Since the reactor coolant flowing through heat exchange tubes 10 has passed through the nuclear reactor, it is radioactive. Therefore, it is important to isolate the coolant flowing through the tubes from the fluid surrounding the tubes. When a defect develops in heat exchange tube 10, it is necessary to either plug or repair heat exchange tube 10 so that no coolant leaks through the tube. When it is desired to plug the heat exchange tube 10, a plug such as tube plug 14 may be inserted in tube 10 and expanded into contact therewith to block the flow of coolant through tube 10.

Tube plug 14 may comprise a substantially cylindrical shell 16 manufactured from a metal such as Inconel with shell 16 having a tapered closed end 18 and an open end 20. Shell 16 also has a main body 22 which is substantially cylindrical and has a groove 24 extending around the outside circumference thereof which is capable of being filled with an elastomeric material 26. Elastomeric material 26 is provided for enhancing the seal between shell 16 and the inside surface of tube 10 when plug 14 is expanded into contact with tube 10. Body 22 has a thickness that is approximately twice the thickness of the wall of closed end 18 for withstanding the force of expansion. Shell 16 defines therein a substantially cylindrical cavity 28 into which an expander (not shown) chosen from those well known in the art, such as roll expander or an hydraulic expander, may be inserted for expanding shell 16 into contact with tube 10.

Tube plug 14 also has a flange 30 formed on shell 16 near open end 20 that has an outside diameter greater than that of shell 16 and tube 10 for contacting the end of tube 10 when inserted therein. Flange 30 provides a means to easily assure that plug 14 has been properly inserted in tube 10 and to prevent plug 14 from being inserted too far into tube 10.

Elastomeric material 26 is chosen to be resistant to high temperatures, to be highly resilient and to maintain that resiliency over a prolonged period at those high temperatures. One such elastomeric material 26 may be an elastomeric silicone which is a room temperature vulcanizing liquid rubber commonly referred to as RTVs which has outstanding thermal stability in comparison with other rubbers and plastics. Industrial grades of elastomeric silicones can be heated at temperatures between 400° to 650° F. without any appreciable change occurring in their physical properties. A particular type of RTV that may be used with plug 14 is Dow Corning 3120 RTV or equivalent. These types of RTVs are pourable rubber bases that become firm, flexible silicone rubber when cured with a standard RTV catalyst.

The leak tightness of a mechanical joint between a tube and a plug inserted and expanded therein depends on the relative stresses imposed upon the tube and plug during the installation of the plug. In general, it is desirable to plastically deform the plug and achieve a minimum amount of elastic recovery in the plug while obtaining the maximum amount of elastic recovery in the tube. Thus, when the plug and tube are expanded during installation of the plug, it is desirable to have the tube retain its elasticity to establish close contact between the plug and tube after the expansion process. In practice, it may be difficult to maintain sufficient elasticity in the tube because the mechanical properties of the tube may be altered during the expansion process. Such a situation could result from the tube being stressed beyond its yield point which could further result in the elastic recovery of the tube being inadequate to exert a sufficient shrinking force around the plug to form a leak-proof joint. This problem is alleviated by the present invention by the use of elastomeric material 26 which provides additional elastic properties to maintain contact between the plug and tube. In addition, since roll-expanded joints are primarily friction joints, this feature will increase friction or resistance to sliding and will tend to increase the strength of the rolled joint.

OPERATION

When it is desired to plug a tube 10 of a nuclear steam generator, the tube 10 may first be prepared for plugging by a bonding or similar process. Next, plug 14 may be either manually or remotely inserted into tube 10 until flange 30 contacts the end of tube 10. In this manner, it can be assured that plug 14 is properly inserted in tube 10. Once in place, a roll expander or an hydraulic expander chosen from those well known in the art may be inserted in cavity 28 and activated to expand shell 16 into contact with the inside surface of tube 10. The expansion of shell 16 causes elastomeric material 26 to establish a leak tight seal between the inside surface of tube 10 and plug 14. Elastomeric material 26 establishes a tight seal even if slight irregularities exist between shell 16 and tube 10. In this manner a heat exchange tube 10 may be plugged to effectively prevent leakage therefrom at burst pressures in excess of 8600 psi.

I claim as my invention:

1. A tube plug for preventing flow through tubes in a nuclear steam generator comprising:
    a substantially cylindrical Inconel shell having a tapered closed end having a thickness of approximately one-half the thickness of the main portion of said shell where said tapered closed end meets the main portion of said shell and having an open end and defining therein a cavity capable of accommodating a device for expanding said shell into contact with said tube with said shell having a groove on the outside surface of said shell and extending completely around the outside circumference of said shell and having a flange formed on said shell near said open end for limiting the insertion of said tube plug into said tube; and
    an elastomeric room temperature vulcanizing silicone material disposed in said groove for establishing a leak-tight seal between said shell and said tube when said shell is expanded into contact with said tube.

* * * * *